Dec. 21, 1954 V. A. SCHLENKER 2,697,760
TRANSIENT TEST EQUIPMENT
Filed June 27, 1951

INVENTOR
Vesper A. Schlenker
BY
ATTORNEY

United States Patent Office 2,697,760
Patented Dec. 21, 1954

2,697,760

TRANSIENT TEST EQUIPMENT

Vesper A. Schlenker, Medford, N. J., assignor to Radio Corporation of America, a corporation of Delaware Application June 27, 1951, Serial No. 233,921

The terminal fifteen years of the term of the patent to be granted has been disclaimed 8 Claims. (Cl. 179—175.1)

This invention relates to a method of and apparatus for determining the characteristics of acoustic transducers, and more particularly to a method of and system for determining the transient characteristics of transducers.

One of the factors which affects the quality or fidelity of a signal being reproduced by a loudspeaker is its transient distortion or the distortion which accompanies sudden changes in volume of the signal applied to the loudspeaker which cause modification of the reproduction of sounds by changes of tonal quality. Transient distortion is distinct from distortion due to overload which is usually expressed in terms of percentage of the total acoustical power for specified single frequency inputs. It is also distinct from distortion caused by limited frequency range which is determined by the frequency limits of the response curve. Transient distortion, heretofore, was not a readily analyzable quantity nor one which permitted measurement so that quantitative limits for acceptable and non-acceptable transducers could be established.

It is an object of the present invention to provide a novel method of and apparatus for determining the transient distortion of a loudspeaker.

It is a further object of the present invention to provide a novel method of and apparatus for measuring the transient distortion of a loudspeaker.

These and other objects of the present invention are achieved by exciting a loudspeaker under test with pulses of test oscillations or tone bursts. The output of the loudspeaker is then detected by a high quality microphone. The microphone output is then separated by an electronic switch into two parts. One part is the detected output of the loudspeaker during the application of a pulse of test oscillations. The second part is the detected output immediately after the cessation of the loudspeaker excitation by a pulse. This second part is representative of the transient characteristics of the loudspeaker and it is integrated and recorded by a level recorder over a desired frequency range of test oscillations while maintaining the pulse repetition rate constant.

Figure 1:
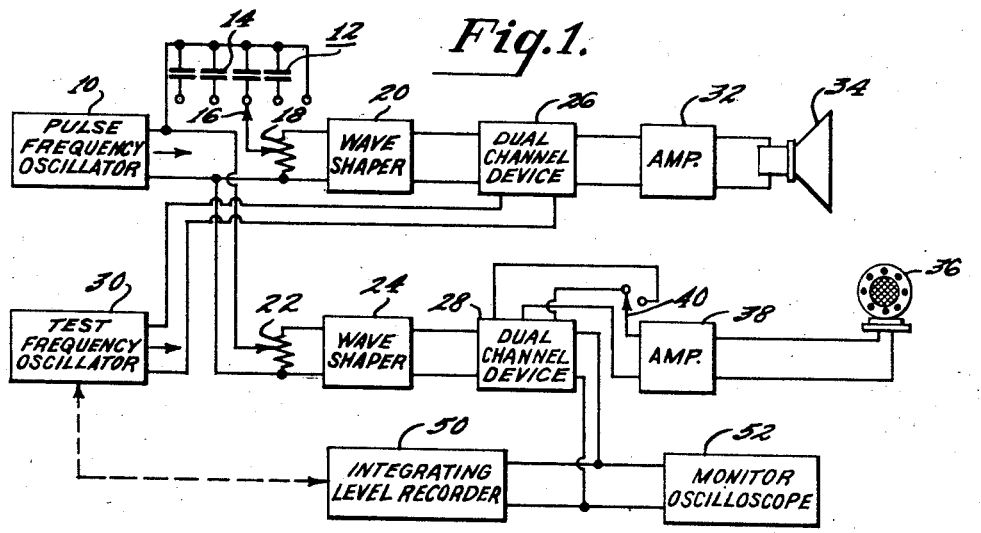
Figure 2:
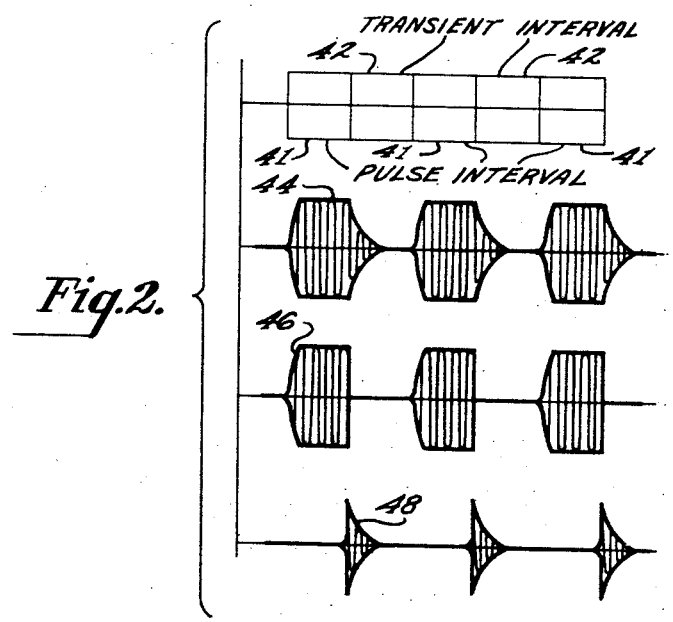
Figure 3:
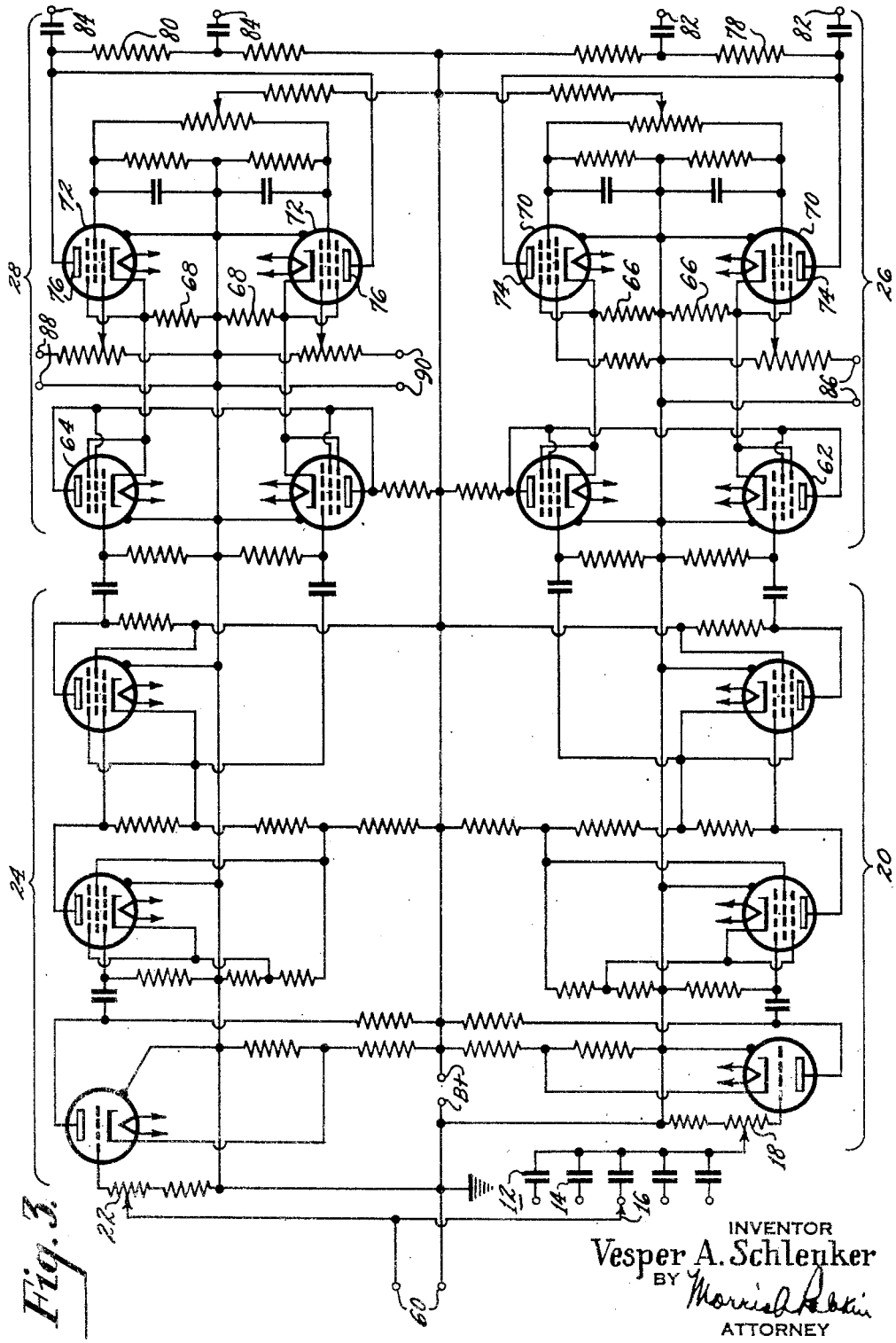

The novel features of the invention as well as the invention itself, both as to its organization and method of operation, will best be understood from the following description, when read in connection with the accompanying drawings, in which Figure 1 is a schematic diagram of an embodiment of the present invention, Figure 2 is a diagram of the waveshapes obtained in the operation of the apparatus shown in Figure 1 which serves to make its operation more clear, and Figure 3 is a circuit diagram of the wave shaper and channel devices shown in Figure 1.

Figure 1 is a schematic diagram of an embodiment of the invention. A pulse frequency oscillator 10 provides sine wave oscillations which are subsequently used to establish a switching rate in a manner to be described herein. The preferable frequency of the pulse frequency oscillator for testing loudspeakers is between 20 and 60 cycles, but may be outside these limits for testing other types of transducers. The output of this oscillator is applied to a variable phase advancing network 12. The output from this network is applied to a first wave shaper 20. Another portion of the pulse frequency oscillator output is applied to a potentiometer 22 which is connected across the input to a second wave shaper 24. The phase advancing network 12 consists of a number of condensers 14, any one of which may be selected by a switch 16 to be connected in series with a potentiometer 18. The amount of phase advance which is provided by this network is determined in a manner to be subsequently described herein. The output of the phase advance potentiometer 18 is connected to the input to the first wave shaper 20.

The first and second wave shapers 20, 24 both serve, in well-known fashion, to square and limit the sine wave output of the pulse frequency oscillator until a rectangular wave shape is provided. The output of both first and second wave shapers are respectively applied to a first and second dual channel device 26, 28. Each of these is what may be considered as a single pole, double throw electronic switch in which the switching rate occurs at the frequency of the pulse frequency oscillator. Their output may be considered as the single pole which is switched from one channel to the other and back at the pulse frequency rate. A test frequency oscillator 30 provides oscillations over the range of frequencies under which a transducer is to be tested. The output from this test frequency oscillator 30 is applied to one of the channels of the first dual channel device 26. Accordingly, the output of this dual channel device consists of pulses of test frequency oscillations. These oscillations are at the frequency of the test frequency oscillator, but have the pulse repetition rate of the pulse frequency oscillator 10. These pulses of test frequency oscillations may also be considered as tone bursts.

The output of the first dual channel device 26 is then amplified by an amplifier 32 and applied to the loudspeaker 34 under test. A high quality microphone 36 is used as a pickup device to detect the output from the loudspeaker 34. The microphone output is then applied to an amplifier 38 and then through a selector switch 40 to the second dual channel device 28. The selector switch 40 is used to select the one of the two channels upon which the amplifier output is to be impressed.

Now, if the phase advancing network 12 is adjusted so that the phase of the switching rate of the first dual channel device compensates for the phase loss or time that is required for the loudspeaker output to travel to the microphone and to be detected there, then the second dual channel device can be used to provide an output which contains either detected output from the loudspeaker which occurs while the loudspeaker is being excited by a pulse of test frequency oscillations or output of the loudspeaker which occurs immediately following the excitation by such a pulse. The one of these two outputs which is obtained is determined by the one of the two channels selected by means of the selector switch 40 connected to the second dual channel device 28.

Another way of explaining the necessity for the adjustable phase advancing network is as follows: It is desired to split the output from the loudspeaker into two parts. The first is that part of the loudspeaker output which occurs while it is being driven. The second is that part of the loudspeaker output which occurs immediately after the cessation of the loudspeaker drive. A single pulse source is available for determining the switching rate of the pulses of excitation for the loudspeaker as well as for closing a switch which is to permit conduction only while the desired portion of the loudspeaker output occurs. If the loudspeaker output were delivered to the second dual channel switching device simultaneously with its excitation from the first dual channel switching device, then the excitation and switching could occur simultaneously. However, there is a lag which occurs because the time for sound to travel from loudspeaker to microphone is appreciable. In this event, if excitation and switching occurred simultaneously, one of the outputs of the second dual channel device would consist of loudspeaker output after the excitation commences and after it ceases, and would include some loudspeaker transients. By advancing the phase of the excitation with reference to the phase of the switching pulse rate, compensation for the loudspeaker to microphone time lag is made and switching is thereby made to occur at a time to insure the separation of the loudspeaker output into the desired two parts. Any phase shift which may be introduced by the electrical networks between the output of the first dual channel device 26 and the input to the second dual channel device 28 may also be compensated for by the adjustable phase shifter 12.

Referring to Fig. 2, there is shown a representation of the wave shapes which occur in the system in order to further assist in clarifying the above. First, there is shown the intervals during which each of the channels of the second dual channel device is opened. Calling the actual duration of the pulse applied to the loudspeaker under test a pulse interval 41, then the interval between pulse intervals can be considered as the transient interval 42. The curve 44 shows the loudspeaker output detected by the microphone after excitation within the pulse interval. This includes the output of the loudspeaker responsive to pulse excitation as well as the transients which are produced at the removal of the excitation. If, referred to the microphone signal, one channel of the second dual channel device 28 is open only during the pulse interval, the output from that channel is the output of the speaker while excited during such interval. This is shown by curve 46 in Fig. 2. If, referred to the microphone signal, the other channel of the second dual channel device is opened only immediately after the excitation of the loudspeaker by a tone burst, then its output is substantially only the transients generated by the speaker after the removal of its excitation. This is shown by curve 48 in Fig. 2.

As previously indicated, a phase delay or time delay occurs as a result of the sound travelling through air between the loudspeaker under test and the high quality microphone. Correction for this could have been made by either retarding the phase of the second dual channel device switching rate to compensate, or by retarding or advancing the microphone output until the second dual channel device switching rate properly switches to permit the proper separation. However, the expedient of advancing the phase of the input to the channel which excites the loudspeaker to compensate for such phase delay proved the most simple and is therefore preferred.

The output from the second dual channel device 28 is applied to an integrating level recorder 50 and to a monitor oscilloscope 52. The integrating level recorder 50 serves both to integrate and to record on a chart the frequency vs. amplitude characteristics, or the transient frequency vs. amplitude characteristics of the loudspeaker 36, depending upon which of the channels of the second dual channel device has been selected. The integrating level recorder is maintained in synchronism with the frequency being provided by the test frequency oscillator 30 in well-known fashion by being mechanically coupled to the drive mechanism which varies the test frequency oscillator frequency output.

The monitor oscilloscope 52 serves not only to provide a means by which the wave shapes may be observed continuously, but also to assist in adjusting the variable phase advancing network 12 properly.

Referring now to Figure 3, the circuit details of the wave shaper and dual channel device are shown. Both first and second wave shapers and dual channel devices were built on the same chassis. The output of the pulse frequency oscillator is applied to the input terminals 60 from which both the second wave shaper 24 is excited as well as the variable phase advancing circuit 12. The output of the variable phase advancing circuit is applied to the first wave shaper 20. The first and second wave shapers each consist of the three stages which in a manner well-known to the art serve to successively clip the sinusoidal input from the pulse frequency oscillator and to shape it into rectangular wave form.

The last tube in each of the first and second waveshapes has an output taken from its anode and another from its cathode and applied to the grids of an associated pair of inverter tubes 62, 64. This provides phase inversion in the manner described in a patent to Meissner, Patent No. 2,027,054. Accordingly, in each channel there are provided rectangular waves which occur 180° out of phase at the frequency of the pulse frequency oscillator.

Each of the tubes in the pairs of inverter tubes 62, 64 has a cathode bias resistor 66, 68 which serves as a common cathode bias for the inverter tube and an associated gate tube. There are two gate tubes 70, 72 in each dual channel device. Each of the gating tubes is so biased that it is only rendered conductive when a pulse is applied to its cathode by means of the cathode coupling with the associated inverter tube. The respective anodes 74, 76 of each pair of gate tubes are connected to a common load resistor 78, 80 for each pair of gate tubes, and the output from the first and second dual channel devices is obtained at output terminals 82, 84 which are connected across the respective load resistors 78, 80. The first dual channel output terminals 82 are connected to the amplifier 32. The second dual channel output terminals 84 are connected to the integrating level recorder 50 and the monitor oscilloscope 52.

Input to one of the gate tubes of the first dual channel device is applied to a pair of terminals 86 connected to the control grid of one of the gate tubes 70. This input is obtained from the test frequency oscillator. Input to either one of the gate tubes of the second dual channel device is applied to the terminals 88 or 90 which are coupled to the control grid of an associated one of the gate tubes 76. Selection of the terminals 88 or 90, to which an input from amplifier 38 is applied, is made by means of the selector switch 40. Only one of the gating tubes 76 in the second dual channel device is opened during the pulse interval and the other of the gating tubes is opened only during the transient interval. Accordingly, dependent upon which of the inputs is connected to the detecting device, the output from the second dual channel device is either the frequency response of the loudspeaker or the transient response of the loudspeaker.

The high quality microphone 36 is selected so that its transient response is negligible compared to that of the transducer under test. These high quality microphones are commercially available. The integrating level recorder is also commercially available and a model FR recorder manufactured by Sound Apparatus Company was used. The recorder draws a curve in decibels vs. frequency.

In operation, the test frequency oscillator is varied over the range of frequencies over which it is desired to test the transducer and a curve drawn of the frequency response of the loudspeaker by the integrating level recorder. Then the test frequency oscillator is varied over the same range, but this time the selector switch is switched so that the second dual channel output is the transient response of the loudspeaker and this is recorded underneath the curve for the frequency response. A direct comparison of the transient response with the frequency response can thus readily be made. It was found that the level of the transient response is a function of the pulse frequency and therefore the measurement of transient distortion must always be stated as a function of the pulse rate as well as any other requirement which may be determined.

Effectively, it may be seen that the circuit in Fig. 3 consists of wave shapers and phase inverters which control a double pole double throw electronic switch.

It should be noted that this system for transient testing is applicable for testing apparatus other than loudspeakers, although the embodiment of the invention has been described in such connection. Any transducer or network, the transient characteristics of which are desired to be investigated, may be inserted in place of the loudspeaker. A suitable detecting or pickup device may be inserted in place of the high quality microphone. Adjustment of the phase advancing network can be made in accordance with the difference in phase of the switching rates in the first and second dual channel device as a result of the introduction of the systems under test.

There has herein been described a novel and simple method of, and apparatus for, determining and measuring the transient distortion of a loudspeaker. This method and apparatus may also be used for other types of acoustic transducers as well as networks.

What is claimed is:

1. A system for determining the characteristics of a transducer comprising means to excite said transducer with pulses of test frequency oscillation, means to detect the output of said transducer, means to separate said detected output into a first portion occurring during the excitation of said transducer by each of said pulses of test frequency oscillation, which portion is representative of the frequency response of said transducer, and into a second portion occurring immediately following excitation by each of said pulses of test frequency oscillation, which second portion is representative of the transient response of said transducer, and means, including recording means, to display a desired one of said separated output portions on said recording means.

2. A system for determining the characteristics of a transducer comprising means to generate pulses of test frequency oscillation, means to excite said transducer with said pulses of test frequency oscillation, means to detect the output of said transducer, means responsive to said pulses of test frequency oscillation, generating means to separate said detected output into a portion of said transducer, output occurring during the excitation by each of said oscillation pulses, which output represents the frequency response of said transducer, and into a portion of said transducer output occurring immediately following excitation by each of said oscillation pulses, which output represents the transient response of said transducer, and means, including recording means, to integrate and display a desired one of said separated output portions on said recording means.

3. A system for determining the characteristics of a transducer comprising a test frequency generator, a first and a second dual channel switching device, means to apply the output from said test frequency generator to one of the channels of said first dual channel switching device, means to apply to said transducer the output from said one channel of said first switching device, means to detect the output of said transducer, switching means to apply said detected output selectively to one of the channels of said second dual channel switching device, and means to alternately gate the dual channels of said first switching device and the dual channels of said second switching device at the same rate but at a difference in time determined by the interval required for said test frequency to travel from the output of said transducer to said detecting means whereby the output from said second dual channel switching device is representative of either the frequency response or transient characteristic of said transducer dependent upon which one of said second device dual channels is connected to said switching means.

4. A system for determining the characteristics of an acoustic transducer comprising a pulse frequency generator, a first and a second dual channel switching device, means to apply a first portion of said pulse frequency generator output to said second dual channel switching device to alternately gate its dual channels, adjustable phase advancing means, means to apply a second portion of said pulse generator output to said phase advancing means to advance its phase a predetermined amount, means to apply output from said phase advancing means to said first switching device to alternately gate its dual channels, a test frequency generator having its output coupled to one of the channels of said first switching device, means to apply output from said one channel of said first switching device to said transducer, means to detect the output of said transducer switching means to connect said detected output to one or the other of said channels of said second switching device, said adjustable phase advancing means being adjusted to compensate for the time required for the output of said transducer to travel from said transducer to said detecting means, whereby output from said second switching device when said switching means is connected to its one channel is representative of the frequency response of said transducer and output from said second switching device when said switching means is connected to its other channel is representative of the transient response of said transducer.

5. A system for determining the characteristics of an acoustic transducer as recited in claim 4 wherein said first and second dual channel switching devices each include rectangular wave shaping means, phase inverting means to which the output of said rectangular wave shaping means is applied, a pair of gating tubes, means to apply the output of said phase inverting means to said pair of gating tubes to alternately gate said tubes responsive thereto, and means to impress said detected output as signals to be gated upon desired ones of said gating tubes.

6. A system for determining the characteristics of a loudspeaker comprising a pulse frequency generator, an adjustable phase advancing network, first and second rectangular wave shaping means, the output of said pulse frequency generator being electrically connected to said phase advancing network and to said second rectangular wave shaping means, the output of said phase advancing network being electrically connected to said first rectangular wave shaping means, first and second phase inverting means respectively electrically connected to the outputs of said first and second rectangular wave shaping means, first and second pairs of gating tubes respectively electrically connected to the outputs of said first and second phase inverting means to be driven thereby, a test frequency generator, means to impress output from said test frequency generator on one of said first pair of gating tubes, means to drive said loudspeaker with the output from said one of said first pair of gating tubes, a microphone positioned to pick up the output from said loudspeaker, switch means to apply the output from said microphone to a desired one of said second pair of gating tubes, and means to integratingly record the output from said second pair of gating tubes whereby, when said adjustable phase advancing network is adjusted to compensate for the time delay occurring between said loudspeaker and said microphone, the output from one of said second pair of gating tubes being representative of the frequency response of said loudspeaker and the output from the other of said second pair of gating tubes being representative of the transient response of said loudspeaker.

7. A method of determining the transient response of an acoustic transducer comprising exciting said transducer with pulses of test frequency oscillations, detecting the output of said transducer, and isolating that portion of said detected output which occurs immediately after the cessation of excitation of said transducer by each pulse of test frequency oscillations whereby said isolated output is representative of the transducer transient response.

8. A method of determining the transient response of an acoustic transducer comprising generating pulses of test frequency oscillations, applying said oscillations to excite said transducer, detecting the output of said transducer, and separating said detected output into a first portion which occurs while said transducer is excited by a pulse of test frequency oscillations and into a second portion which occurs immediately after the cessation of the excitation of said transducer by a pulse of test frequency whereby said second portion is representative of the transient response of said transducer.

References Cited in the file of this patent

UNITED STATES PATENTS

| Number | Name | Date |
| --- | --- | --- |
| 2,175,001 | Sherman | Oct. 3, 1939 |
| 2,224,909 | Hackley | Dec. 17, 1940 |
| 2,534,565 | Warren | Dec. 19, 1950 |
| 2,558,550 | Fiske | June 26, 1951 |